Jan. 21, 1930.  W. H. WHITACRE  1,744,516
CRAWLER TRACTOR
Filed Sept. 16, 1925   6 Sheets-Sheet 4

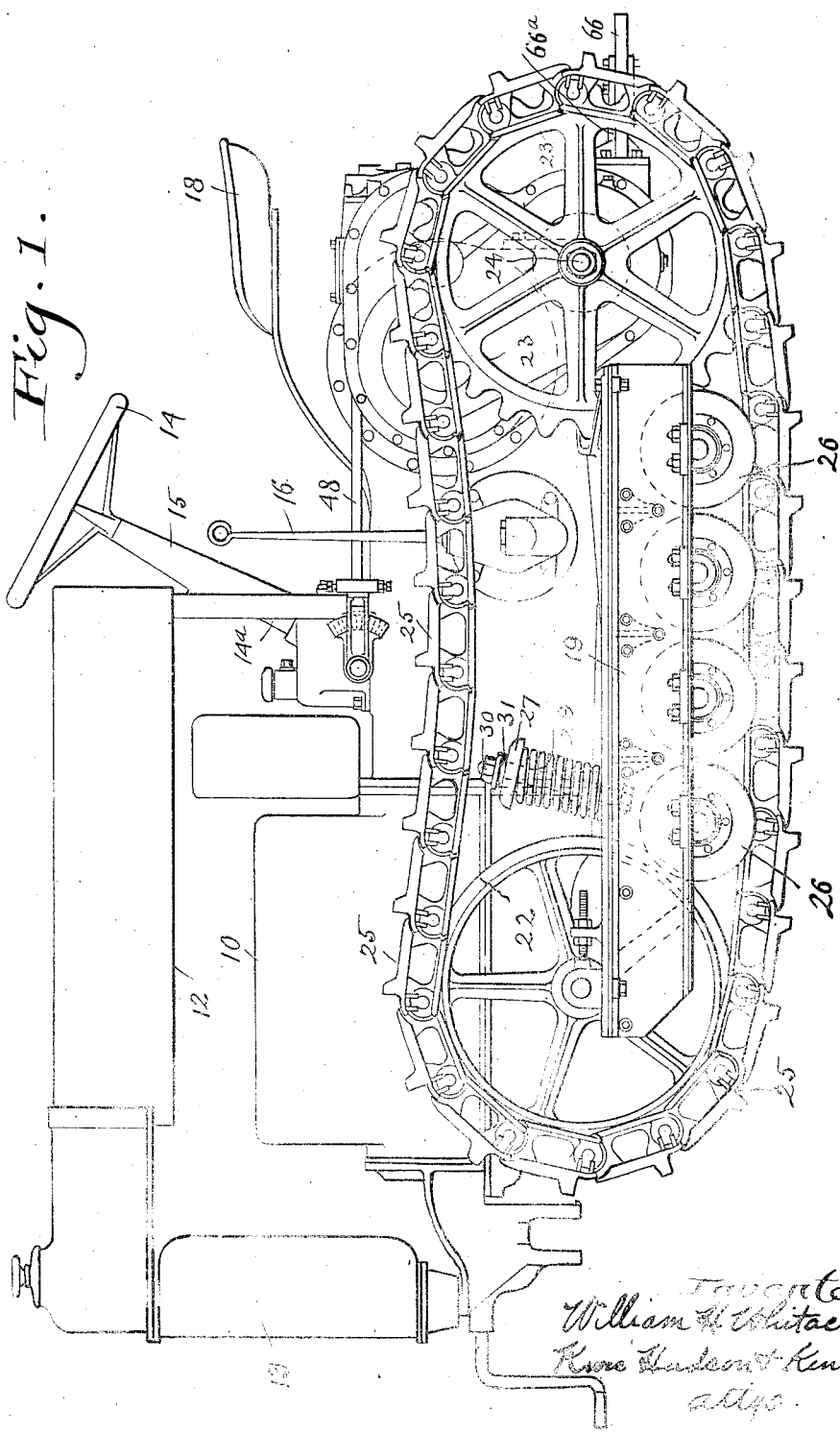

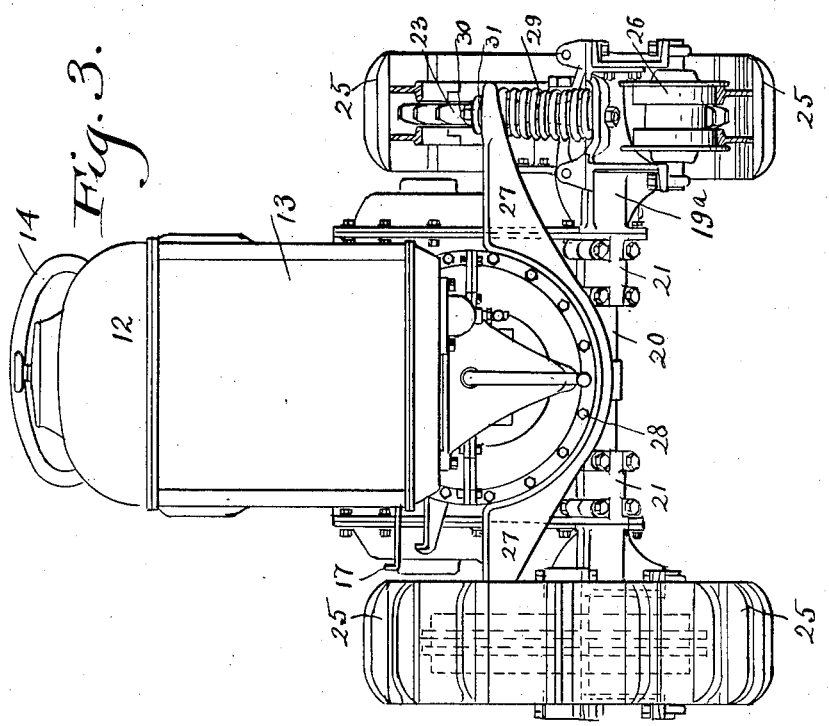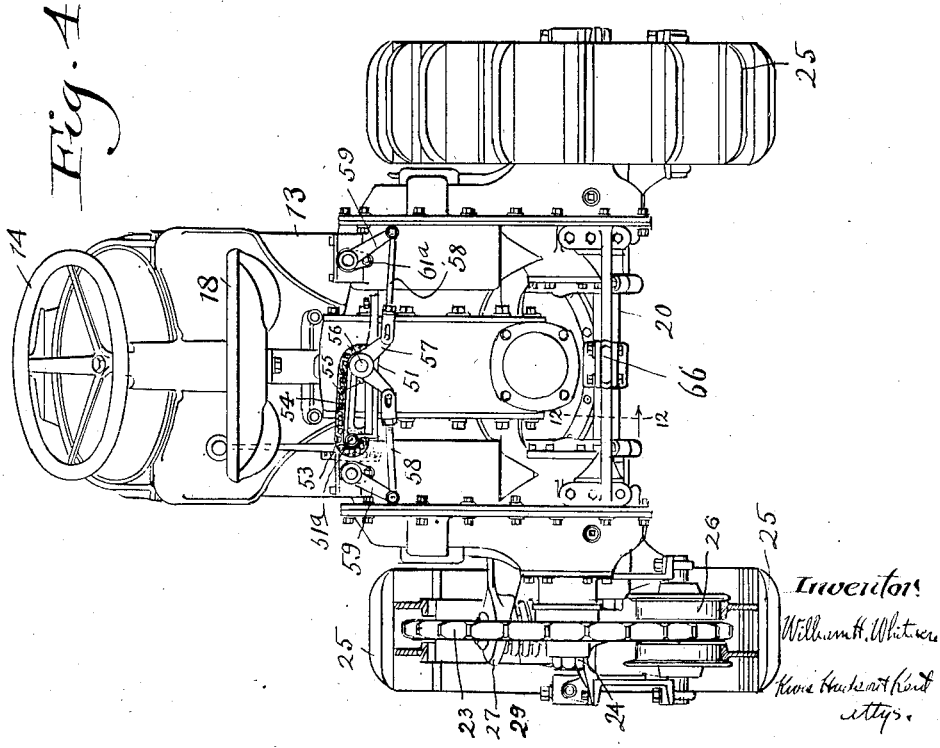

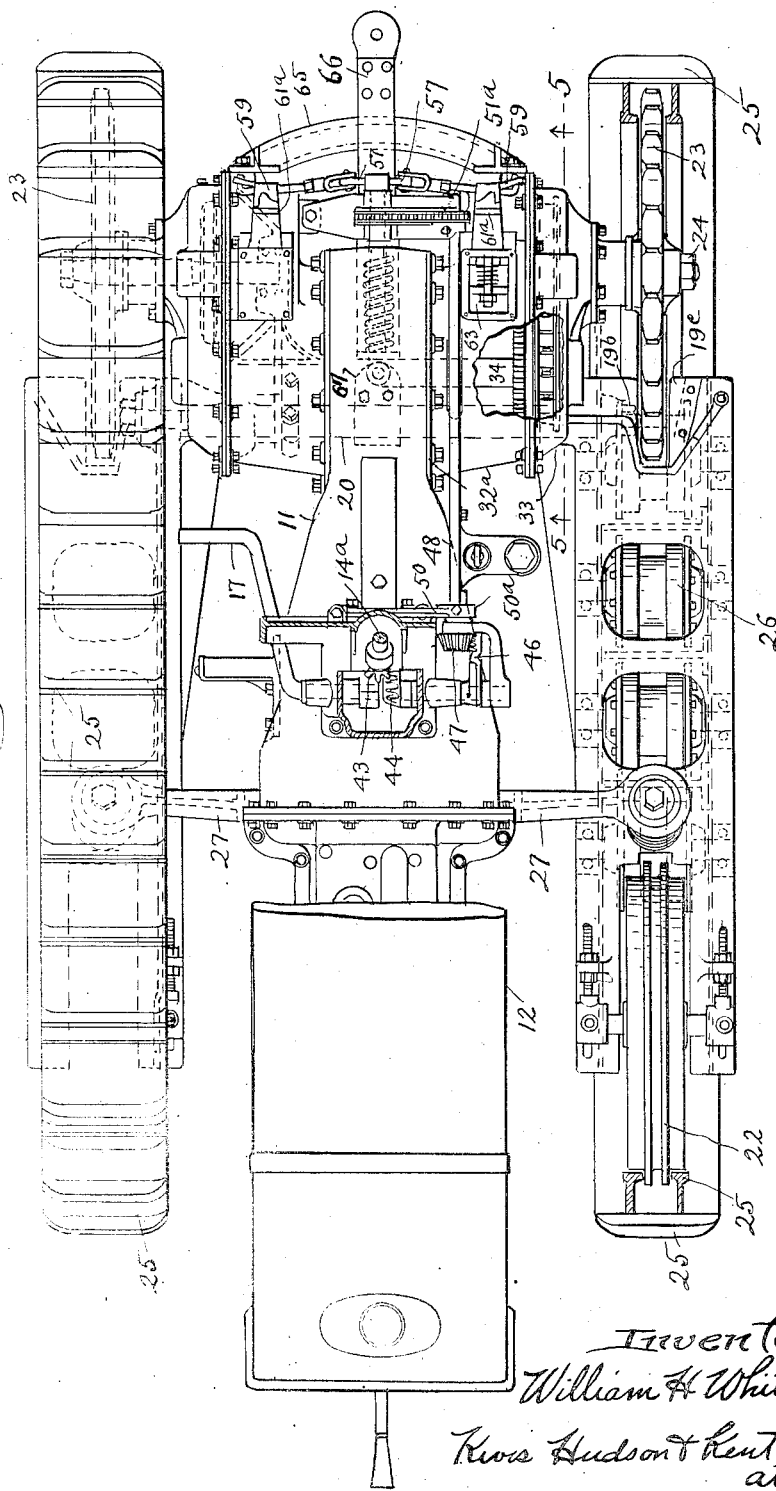

Inventor
William H. Whitacre
Kwis. Hudson & Kent
attys.

Jan. 21, 1930.  W. H. WHITACRE  1,744,516
CRAWLER TRACTOR
Filed Sept. 16, 1925  6 Sheets-Sheet 5
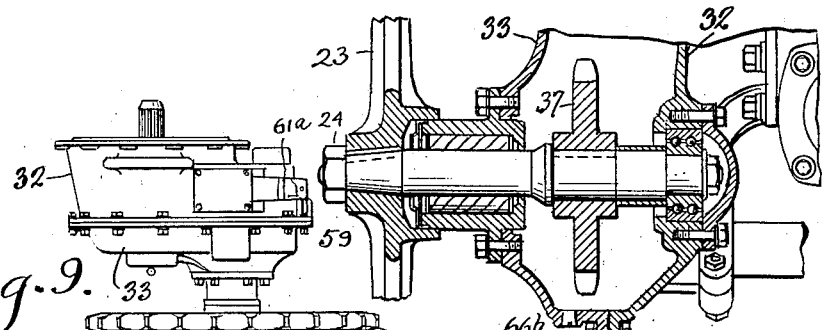
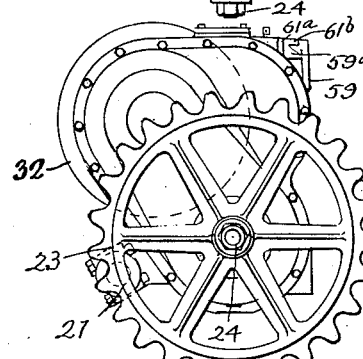
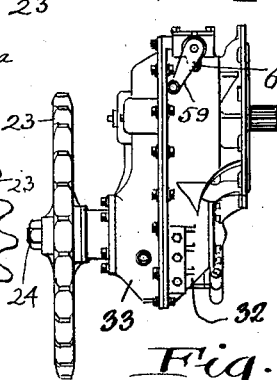
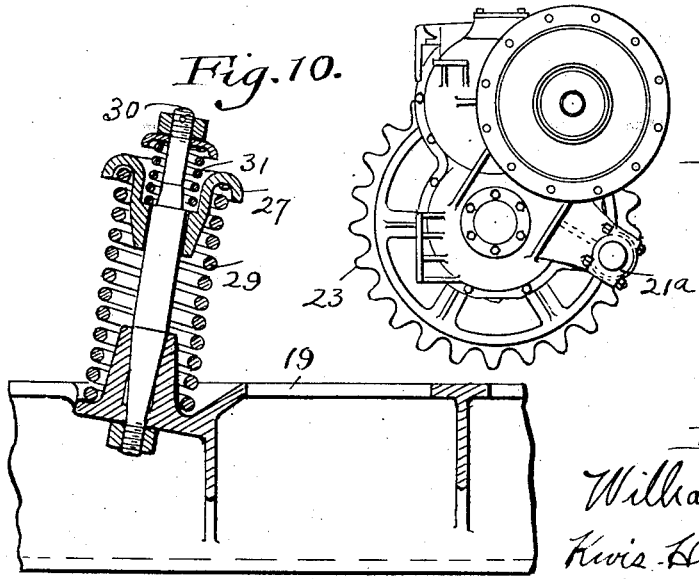

Jan. 21, 1930. W. H. WHITACRE 1,744,516
CRAWLER TRACTOR
Filed Sept. 16, 1925 6 Sheets-Sheet 6

Inventor
William H. Whitacre
Kwis Hudson & Kent
attys

Patented Jan. 21, 1930

1,744,516

UNITED STATES PATENT OFFICE

WILLIAM H. WHITACRE, OF CLEVELAND HEIGHTS, OHIO, ASSIGNOR TO CATERPILLAR TRACTOR CO., OF SAN LEANDRO, CALIFORNIA, A CORPORATION OF CALIFORNIA

CRAWLER TRACTOR

Application filed September 16, 1925. Serial No. 56,637.

This invention relates to tractors of the crawler type, and has for one of its objects the provision of a crawler tractor, which as regards its weight, tractive ability and drawbar capacity is well adapted for agricultural purposes and also for industrial use, particularly in the lighter operations connected with earth moving, road construction and maintenance and the moving of materials in many types of construction work.

More particularly, it is the aim of the invention to provide what may be termed a crawler attachment for the Fordson wheel tractors, by which attachment a Fordson tractor may be converted into a tractor of the crawler type having the well established principles or standard features of construction embodied in crawler tractors of the most approved designs. That is to say, it is the aim of the invention to be enabled to employ the power plant transmission and differential gearing of the Fordson tractor and to provide a crawler attachment which will not only convert the tractor into one of the crawler type and thereby overcome certain objections to Fordson tractors and tractors generally of the wheel type, but at the same time embodying features which have become standard in crawler tractors by reason of years of development and usage with the accompanying advantages in proper weight distribution, increased traction and drawbar capacity, greater stability and the like.

In carrying out my invention in its preferred form, the conversion of the Fordson tractor to the crawler type is accomplished by eliminating the front axle and wheels, the rear axles, and wheels and rear axle housings, and by applying to opposite sides of the transmission housing of the Fordson power plant special driving units, track frames and endless tracks, with a suitable support for the forward portion of the power plant on the track frames, as well as a steering mechanism coupled to the standard Fordson steering wheel, with provision for steering through the control of the endless tracks.

The invention may be further briefly summarized as consisting in certain novel details of construction, and combinations and arrangements of parts which will be described in the specification and set forth in the appended claims.

Figure 5:
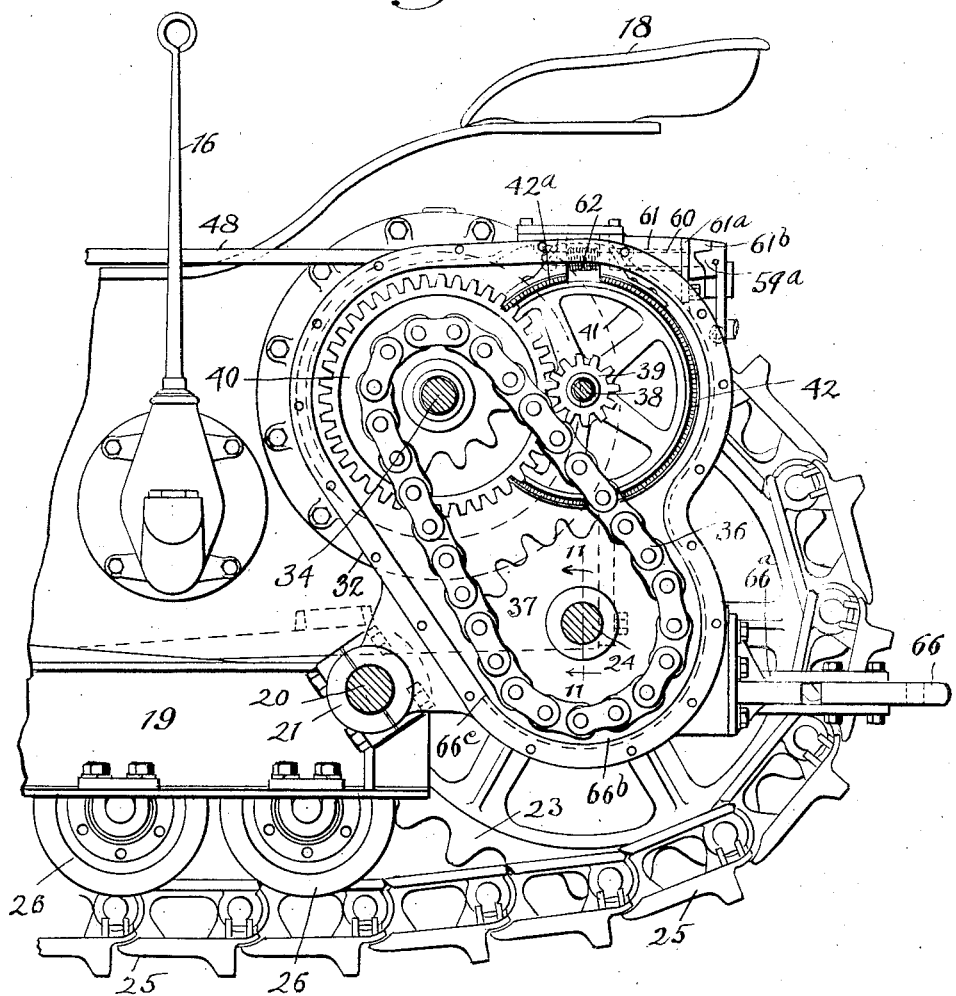
Figure 13:
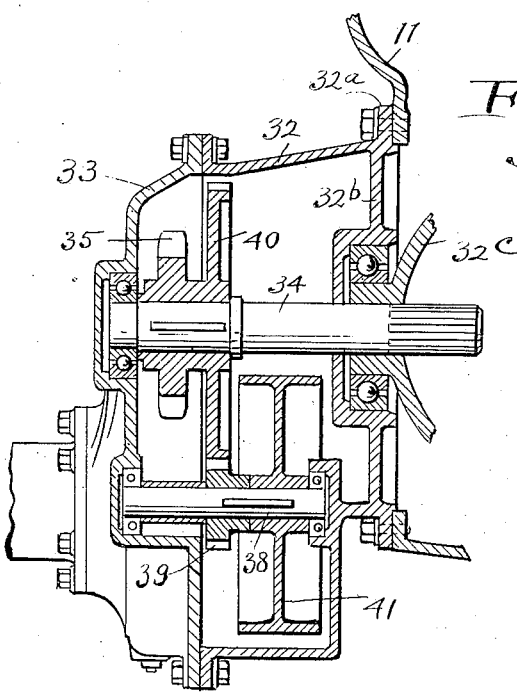
Figure 12:
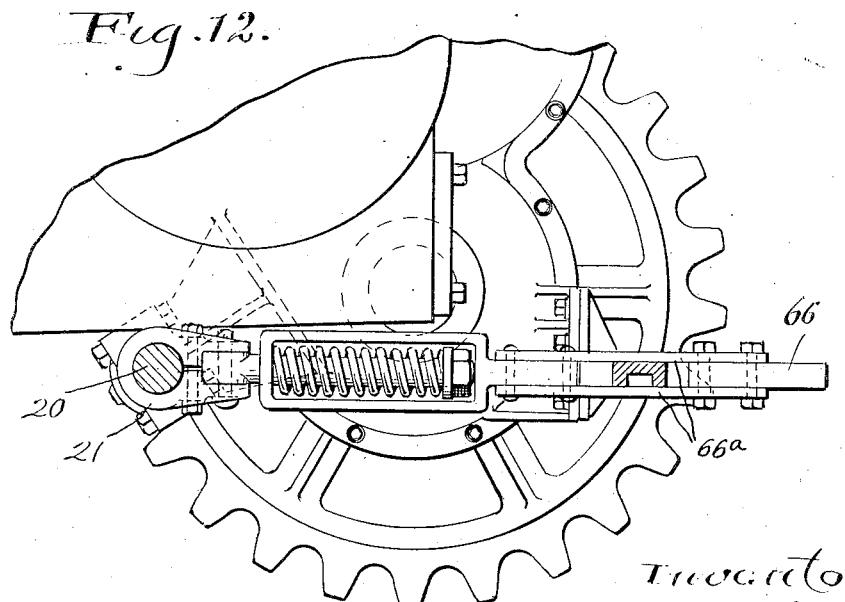

In the accompanying sheets of drawings wherein I have shown an embodiment of the invention which operates very effectively, Fig. 1 is a side elevation of my improved tractor, i. e. the various parts of the crawler attachment embodying the invention applied in the manner briefly stated above to the Fordson tractor; Fig. 2 is a top plan view of the same with certain parts omitted and broken away; Fig. 3 is a front elevation of the same with one of the endless tracks in section to show the spring mounting for the yoke supporting the front portion of the power plant upon the track frames; Fig. 4 is a rear elevation with one of the endless tracks in section; Fig. 5 is a view looking at the inside of one of the driving units with the cover plate removed, this view being substantially a section along the line 5—5 of Fig. 2, looking in the direction indicated by the arrows; and Figs. 6, 7, 8 and 9 are views of the driving unit, Fig. 6 being an outside side elevation; Fig. 7 an inside side elevation, Fig. 8 a rear elevation; Fig. 9 a top plan view; Fig. 10 is a detail sectional view through a portion of one of the track frames and showing the resilient connection between the track frame and a yoke on the power plant; Fig. 11 is a fragmentary vertical sectional view substantially along the line 11—11 of Fig. 5; Fig. 12 is a fragmentary vertical sectional view substantially along the line 12—12 of Fig. 4; and Fig. 13 is a fragmentary horizontal sectional view of one of the driving units, the section being taken substantially through shafts 34 and 38.

In the drawings I have indicated rather conventionally, the power plant of the Fordson tractor which forms a part of my improved tractor with the crawler attachment applied thereto, these conventionally shown parts including the engine 10, transmission housing 11 which encloses the fly-wheel, clutch and transmission of the usual Fordson power plant. In this instance the power plant forms the main frame of the tractor. Above and in front of the engine 10 is the fuel tank 12 and the radiator 13. I have shown also the standard Fordson steering wheel 14, which with its steering shaft 14ª is supported in the dash and steering wheel mounting 15. The transmission gear shifter lever is shown at 16, and the clutch throw-out pedal at 17, the former being indicated in Fig. 1, and the latter in Fig. 2. The operator's seat is indicated at 18, supported in the usual manner on the leaf spring supported on the transmission case. Some other details or features of the Fordson tractor are illustrated, but the same are not material to my invention and need not be referred to.

As already stated, the wheels, front and rear axles and rear axle housings are removed, and in place the supporting and ground-engaging portions of the attachment are supplied, these including two track frames 19 which are pivotally supported at their rear ends on a stationary rear cross-shaft 20, which cross-shaft is fixedly secured in bearings 21 on the driving units shown most clearly in Figs. 5 to 9. The cross-shaft itself is shown by dotted lines in Fig. 2, and by full lines in Figs. 3, 4 and 5.

This portion of the attachment includes also idler wheels 22, adjustably mounted in the front ends of the track frames 19, rear driving sprockets 23 supported on shafts 24 by the driving units, and endless tracks 25 which extend about the front idlers 22 and rear driving sprockets 23. The tracks 25 are composed of metal shoes pivoted together with bushings and pins in the usual manner. Secured to the lower sides of the track frames 19 are flanged track wheels 26 which engage the rails of the endlesss tracks 25 and support the entire weight of the tractor, neither the idlers 22 nor the driving sprockets 23 normally carrying any part of the weight of the tractor.

The weight of the rear part of the power plant is transmitted to the track frames through the driving units (Figs. 5 to 9) and shaft 20, and the forward portion of the power plant is spring mounted or supported on the track frames 19 by means of a special yoke 27 which extends crosswise of the tractor beneath the power plant at the joint between the rear end of the engine 10 and front end of the transmission case 11. This yoke has a substantially semi-circular middle portion with flanges engaging the flanges at the meeting faces of the engine 10 and transmission housing 11, and the yoke is secured in place by longer bolts 28 similar to those which regularly secure the engine and transmission housing flanges together. The yoke 27 has its ends in the form of laterally projecting arms which extend over the track frames, and the weight of the forward portion of the power plant is transmitted to the track frames through coil springs 29 surrounding studs or bolts 30 which extend up through the track frames, and through the outer ends of the arms of the yoke, both track frames and arms having suitable guides or seats for the springs. Suitable recoil checks, in this instance in the form of auxiliary springs 31, are arranged between the ends of the yoke arms and nuts on the ends of the bolts 30 to check and cushion the recoil of springs 29. Inasmuch as the track frames are pivoted at their rear ends, these springs 29 permit the track frames to swing independently of each other around the axis of the pivoting shaft 20 as the tractor passes over uneven ground, and in this way permit the tracks to accommodate themselves to irregularities of the ground surface and enable the tractor to maintain full traction. Additionally these springs protect the power plant from destructive vibration which would otherwise be transmitted to it where there is no resilient connection between the power plant and the ground engaging members.

The shape of the yoke 27 and the method of attachment are important features of the invention. By giving the yoke a substantially semi-circular portion, which is attached at a plurality of points to a correspondingly shaped portion of the power plant, the stresses transmitted from the track frames to the power plant are distributed instead of being localized or concentrated at one point, and furthermore, by attaching the yoke to the flanges connecting the engine to the transmission housing, the yoke application or attachment is made where there is an extra or double thickness of metal very well suited for this purpose, this latter feature being a factor in securing the strength and durability of construction.

It will be observed by reference to Fig. 10 that the yoke ends are provided with circular flange-like extensions through which the bolts or studs 30 extend and are guided, the chief function being to limit the lateral or side movement of the track frames. The bolts or studs 30 have their lower ends fitted into tapered sockets of the track frames forming a tight fit but enabling them to be removed and renewed when necessary.

Taking up next the details of the driving mechanism, it will be noted that secured to opposite sides of the rear portion of the transmission housing 11 are what I have heretofore termed driving units. Each of these units includes a housing 32 provided on its inner side with a flange 32ª, bolted to the adjacent side of the transmission housing 11, and it includes also a cover plate 33, bolted to the outer side of the housing 32, both members having flanges which are bolted together as illustrated.

The driving units additionally include differential shafts 34 which at their inner ends have driving engagement with the differential not shown in the transmission housing 11, this differential being of usual construction and being driven by the usual worm gearing not shown, which in turn is driven by the engine through the usual clutch and transmission, all the last mentioned parts being elements of the power plant of the Fordson tractor.

The shafts 34 are, of course, oppositely disposed, and their inner ends engage the differential gears and are journaled in the differential housing and their outer ends supported and journaled by anti-friction bearings in the covers 33 of the driving units. The differential housing itself designated 32<sup>c</sup> in Fig. 13 is suitably journaled in the regular Fordson anti-friction bearings supported by the inner walls 32<sup>b</sup> of the housings 32 of the driving units as shown in Fig. 13.

Secured to the differential shafts 34, near their outer ends, are sprockets 35, connected by sprocket chains 36 to sprockets 37 secured on the shafts 24 which were previously referred to, and which support the sprockets 23 which drive the before mentioned endless tracks 25. The shafts 24 are journaled in anti-friction bearings supported by the housings 32 and their cover plates 33, (see Fig. 11) the inner bearing for each of these shafts having suitable provision for holding the shaft against endwise movement.

It will be noted that shafts 24 are located below the differential shafts 34. They are also located to the rear of the differential shafts so that the track driving sprocket centers occupy a position about in line with the extreme rear of the transmission housing the power plant. This secures a placement of the weight of the power plant upon the track frames which gives the tractor a suitable balance as to weight distribution, particularly placing a considerable portion of the power plant weight well forward with reference to the tractor's length. Likewise it will be noted that the sprockets 37 are somewhat larger than the sprockets 35, this being desirable in order to obtain a reduction of speed of the driving elements from the transmission of the Fordson power plant to the track driving sprockets. In this connection it might be stated that it may be desirable that the tractor with the crawler attachment be driven, for any given engine speed, at the same rate that the Fordson tractor is driven with its ground wheels. Inasmuch as the track driving sprockets are of considerably less diameter than the rear ground wheels of the ordinary Fordson tractor, in order to secure a suitable reduction in speed of the driving elements, I may use as a part of the Fordson transmission a higher speed ratio worm gearing than is regularly used in that tractor, it being only necessary to make this substitution by unbolting and removing the regular worm gearing and replacing it with worm gearing of the higher speed ratio. This is not at all essential, however, for the worm gearing regularly supplied in the Fordson tractor may be retained. The high speed position of the Fordson transmission then furnishes the working speed of the tractor and the intermediate and usual working speed position of the Fordson transmission generally furnishes the low speed of the tractor.

Before referring to the unitary construction of the so-called driving units and describing how they are applied, I will next take up the steering of the tractor inasmuch as part of the steering mechanism is embodied in the driving units.

I employ what is known as differential steering, operated through the Fordson steering wheel, and connected to brakes which reduce the speed, or stop entirely either one of the differential shafts 34 and its associated endless track 25, depending upon the direction in which the tractor is to be turned, at the same time allowing the other shaft to rotate freely, and at higher speed than it would ordinarily rotate. I accomplish this by very efficient and compactly arranged mechanism, as follows:

Each driving unit is provided at the rear of the associated differential shaft 34, with a high speed brake-shaft 38, suitably supported by anti-friction bearings in the driving unit case 32 and its cover plate 33, and held against endwise movement by such bearings. Each of these shafts is provided with a pinion 39 engaged by a gear 40, fixedly secured on the associated differential shaft 34. The relative diameters of the pinion 39 and gear 40 are such that the brake-shaft is driven at several times the speed of the differential shaft. The brake-shafts 38 are provided with brake-drums 41 each engaged by a brake-band 42 formed or lined with any suitable wear-resisting brake material.

The steering wheel 14 and the associated steering wheel shaft 14<sup>a</sup> which in the regular Fordson tractor are connected to the front ground wheels, are in this instance utilized to control the brake-bands 42 which are coupled to the steering wheel shaft 14<sup>a</sup> in the following manner: The lower end of the steering wheel shaft 14<sup>a</sup> has the usual bevel pinion 43 engaging a bevel sector 44 secured in this instance on a special shaft 45 journaled in the lower part of the dash 15. This shaft 45 is provided with a bevel sector 46 which is similar to the sector 44, the sector 46 engaging a bevel pinion 47 which is similar to the pinion 43, and mounted on the forward end of a steering shaft 48 which extends horizontally rearward past the power plant and over one of the driving units, the steering shaft referred to passing through a suitable depression or recess formed in the driving unit for clearance purposes. The forward end of steering shaft 48 is journaled in a boss at one extremity of a substantially L-shaped bearing member 49, at the other extremity of which is a boss in which the outer end of shaft 45 is journaled. The first mentioned extremity of this bearing member 49 is provided with a rearwardly extending sleeve adjustably supported in a boss 50ª of a bracket 50 which is bolted to the dash 15. Thus the bearing member 49 not only supports the forward end of the steering shaft 48, but prevents end play by taking the thrust on the bevel pinion 47.

The rear end of the steering shaft 48 is journaled in a boss 51ª of a bracket 51 which extends crosswise of the tractor at the rear of the transmission housing 11, and is bolted to pads 52 projecting inwardly from the rear portions of the housings 32 of the driving units. Preferably this bracket is secured at one end by a single bolt and at its opposite end by two bolts to the pads 52, as illustrated in Fig. 2, so as to permit proper alignment and adjustment.

The rear end of the steering shaft 48 is provided with a sprocket wheel 53 engaged by a sprocket chain 54 engaging a second sprocket wheel 55 secured to a short shaft 56 journaled in two bosses of the bracket 51, which bosses are located in the central plane of the machine, directly behind the transmission housing 11.

Secured to the rear end of this shaft 56 is a bell-crank 57, the two arms of which have pin and slot connections with two oppositely extending links 58 (see particularly Fig. 4) whose outer ends are pivotally connected to arms 59 secured at their upper ends to the outer ends of rock-shafts 60 which are horizontally disposed and extend forwardly into the steering brake portions of the housings 32 of the driving units immediately above the two brake-drums 41 (see particularly Fig. 5). These shafts 60 are journaled in sleeves or bushings 61 extending horizontally inward through bosses formed on the upper rear portions of the driving unit housings 32, and these bushings have flanges 61ª bolted to the rear faces of the bosses (see Figs. 5 and 8). Rearwardly of the flanges 61ª and integral therewith are cams 61ᵇ which are engaged by companion cams 59ª formed on the forward faces of the hubs of the arms 59 (see Fig. 5). By reason of this construction the rocking of the arms 59 causes endwise movement to be imparted to the shafts 60, but by reason of the pin and slot connections, shown in Fig. 4, between the arms of the bell-crank 57 and the links 58, it is obvious that rotation of the steering wheel in one direction will produce endwise movement of one rock shaft while rotation of the steering wheel in the opposite direction will produce endwise movement of the other rock-shaft; also that one rock-shaft or the other may be operated by the steering wheel but not both at the same time.

The shafts 60 extend through ears of lugs 42ª secured to the ends of the brake-bands 42, as clearly shown in Fig. 5. The upstanding ear of the rearward lug bears against the inner end of the sleeve or bushing 61, and is therefore held stationary while the ear on the opposite lug is engaged by a suitable abutment, in this case an adjustable nut on the inner end of the rock-shaft 60. Between the lugs is a coil spring 62, the function of which is to expand the band and to keep it out of engagement with the drum.

It will be seen therefore that when the steering wheel is turned in one direction, one of the shafts 60 is cammed outward or rearwardly, contracting the associated brake-band around its drum to an extent depending upon the amount which the steering wheel is turned, and either slowing down or stopping entirely the drum, and therefore the differential shaft 34 to which it is geared, the other band remaining in its expanded state, allowing its associated drum to rotate freely. When the steering wheel is turned in the opposite direction, there is a similar action on the second mentioned brake-band, the first mentioned remaining idle or being unaffected. In this manner the tractor can be turned in either direction by slowing down or stopping the endless track on the side toward which the turn is to be made.

It will be seen that by reason of the fact that each differential shaft is connected to the associated brake-drum by high speed gears having a considerable difference in diameter the braking effect on the drum is transmitted through a considerable leverage to the differential shaft. For a given braking effect this allows me to employ a drum considerably smaller than would be required without the advantage of this increased leverage, and, in fact, a drum small enough to be enclosed in the space within the driving unit housing, thus avoiding the destructive action of water and grit on the brake lining. Additionally, for a given braking action imparted to the differential shaft, much less pressure of the band on the drum is required than would be the case if the drum were mounted directly on the differential shaft, as has been attempted heretofore. Wear on the linings of the brake-band is therefore minimized; also far greater smoothness and accuracy of steering is obtained.

Immediately above the brake-drums the two driving unit housings 32 are provided with openings 63 for giving access to the brake mechanism, and particularly for the purpose of adjusting the bands. These openings are normally closed by cover plates 64, one of the latter being removed in Fig. 2.

The driving unit housings 32 with their cover plates 33 entirely enclose the various gears, sprockets and associated parts of the driving and steering mechanism in an oil-tight and dust-proof case to which lubricant may be supplied through the openings 63, this case forming a reservoir holding the desired quantity of oil and in which the parts work in a bath of oil.

It might be here stated that the oil reservoirs of the two driving units are separate from the oil reservoir in the transmission housing of the Fordson power plant, the former reservoirs being separated from the latter by the inner walls or sides 32$^b$ of the driving unit housings 32, these inner walls being entirely closed except for one opening in each wall to accommodate the differential shaft, and in the case of that opening the wall thereof fits closely around the shaft, preventing the escape of oil from the transmission housing into the driving unit housings.

In Figs. 6 to 9 I have shown one of the so-called driving units assembled and ready for shipment and application to the tractor. In converting a Fordson wheel tractor to one of the crawler type by the application of my improved crawler attachment, the front and rear wheels, front and rear axles and rear axle housings are removed, and two of my improved driving units are applied and bolted to opposite sides of the transmission housing 11 where the rear axle housings regularly are applied. In applying the driving units the splined ends of the differential shafts are slipped into driving engagement with the differential gears which they are adapted to engage, and when this is done the units can be bolted in place. Prior to the application of these units, the original worm gearing may be replaced with one of a higher speed ratio for the purpose explained heretofore.

It will be noted by reference particularly to Figs. 5 and 7, that the bearings 21 for the stationary cross-shaft on which the track frames are pivoted, are carried by the housings 32 of the driving units. Generally in applying my attachment, after the driving units are applied as explained above the cross-shaft 20 is next applied to the bearings 21 and fixedly secured in place by tightly bolting in place the removable caps of the bearings 21. This cross-shaft not only forms a pivot for the track frames, but also serves to rigidly connect the driving unit housings, and therefor becomes an effective stiffening member for the tractor.

The housings of the two driving units are connected together also by a second stiffening member, the same consisting of so-called draw-bar support 65, which as clearly shown in the drawings, consists of a curved, ribbed, and therefore stiffened member which extends across the rear of the machine from one driving unit housing to the other, and is securely bolted thereto. Thus the housings of the driving units are not only bolted to the transmission housing, but the overhanging or depending and rearwardly extending portions thereof are rigidly connected together by the forward cross-shaft 20 and the rear draw-bar support 65, relieving the transmission housing 11 of stresses to which it might otherwise be sujected. In addition to forming a pivot for the track frames, and as a bracing member, the cross-shaft 20 performs still an additional function, namely, as the attaching point for the draw-bar. The draw-bar, which is illustrated in Figs. 1, 2 and 12 at 66, has at the rear a draw-bar end to which is attached a pair of bars 66$^a$, which straddle and are adapted to slide over the top and bottom surfaces of the draw-bar support 65. The forward ends of these bars are attached to a spring barrel 66$^b$ (see Fig. 12), containing a cushioning spring 66$^c$, which surrounds a bolt or link 66$^d$, pivoted to a device 67, secured to the center of the cross-shaft 20. The line of pull of the draw-bar is therefore below the center or axis of the driving sprockets 24, as is desirable. At the same time, the location of the various parts is such that the pull of the draw-bar is transmitted to the driving unit housings, and from the latter to the driving sprockets, and then to the tracks in the most direct manner, with the least possible development of stresses in these parts.

In addition to the advantages above stated, it should be noted that the radial action of the draw-bar and a minimum of stresses being communicated to the transmission housing of the tractor power plant permits easy turning of the tractor under load, without imposing undue wear and tear on the steering mechanism.

Continuing with the mode of assembly of the attachment, after the driving units have been applied and the cross-members 20 and 65 secured in place, the track frames 19 are applied by giving them their pivotal attachment or connection with the cross-shaft 20. The track frames are of box construction open at the bottom, and each preferably consists of two main members. the one in the form of a casting 19$^d$ which forms the top and inner side of the track frame and the other in the form of a rolled section of channel 19$^e$ which forms the outer side of the track frame and is bolted to the cast portion as best indicated in Fig. 3. The casting is provided near its rear end with suitable strengthening ribs, and with the bearing portion designated 19$^a$, which slips onto the projecting end of the cross-shaft 20, just outside the stationary bearing 21 therefor. This bearing portion 19$^a$ at one side engages the stationary bearing 21, and at the opposite side is held in place by a nut 19$^b$ and suitable washer indicated by dotted lines in Fig. 2.

Following this, the front supporting cross yoke 27 is bolted in place, the spring assemblies including the parts 29, 30 and 31 are applied, and when the tracks 25 are applied to the sprockets and that part of the steering mechanism carried by the driving units is connected up to the steering wheel shaft, the assembly is completed.

It might be stated that through the rear parts of the track frames straddle the driving sprockets 23, it is possible to remove the driving sprockets without removing the track frames and without taking the weight of the tractor off the track wheels 26, this being rendered possible by providing at the rear end of each track frame a removable section indicated at 19°, which when removed gives sufficient space for whatever manipulation of the driving sprockets is necessary to remove them from their shafts.

Likewise it is also possible without further dismantling the tractor to obtain access to the driving mechanism in the interior of the driving housing by first removing the sprocket or sprockets 23 and either or both cover plates 33 of the driving unit housings.

While I have shown the preferred construction, which answers the requirements very effectively, I do not desire to be confined to the precise details either of construction or arrangement, or mode of application, but aim in my claims to cover all modifications which do not involve a departure from the spirit and scope of the invention as set forth in the appended claims.

Having described my invention, I claim:

1. In a tractor, a power plant, driving units attached to opposite sides of the rear end of the power plant, track frames and endless tracks on opposite sides of the power plant, the tracks being carried on front idlers and rear driving sprockets, said driving units including housings and sprocket-driving elements therein, and a cross-shaft rigidly secured to the lower portion of said driving unit housings, the track frames being pivoted to said cross-shaft.

2. In a tractor, a power plant, driving units secured on opposite sides of the rear portion of the power plant, track frames and endless tracks on opposite sides of the power plant, the tracks being carried by front idlers and rear driving sprockets, the driving units including housings and driving elements therein for the driving sprockets, and a plurality of rigid cross-members secured to the lower portion of the housings, the track frames being pivotally connected with one of said cross-members.

3. In a tractor, a power plant, driving units secured on opposite sides of the rear portion of the power plant, track frames and endless tracks on opposite sides of the power plant, the tracks being carried by front idlers and rear driving sprockets, the driving units including housings and driving elements therein for the driving sprockets, and a pair of rigid cross-members secured to the housings one in advance of the other, the track frames being pivotally mounted on the forward cross-member.

4. In a tractor, a frame including a power plant, driving units including housings secured to opposite sides of the rear portion of the frame and having driving elements therein, track frames and endless tracks on opposite sides of the power plant, rear driving sprockets for the tracks adapted to be driven by the driving means in said housings, and a rigid cross-member secured to the lower portion of said housings, the track frames being pivoted to said cross-member and the latter having draw-bar attaching means.

5. In a tractor, a power plant, a pair of driving units including housings secured to opposite sides of the rear portion of the power plant and driving elements therein, a pair of pivoted track frames and endless tracks on opposite sides of the power plant, rear driving sprockets for said tracks connected to said driving units, a pair of rigid cross-members secured to said housings one in advance of the other and a draw-bar having a support on the rear cross-member and attached to the forward cross-member.

6. In a tractor, a frame including a power plant, a pair of driving units including housings secured to opposite sides of the rear portion of the frame, and driving elements therein, a pair of pivoted track frames and endless tracks on opposite sides of the frame, rear driving sprockets for said tracks connected to said driving units, a pair of rigid cross-members secured to said housings one in advance of the other, and a draw-bar having a support on the rear cross-member and attached to the forward cross-member, said track frames being pivoted to the forward cross-member.

7. In a tractor, a power plant, track frames and endless tracks on opposite sides of the power plant, rear driving sprockets for the tracks, driving units including housings on opposite sides of the rear portion of the power plant and driving means including differential shafts connected to said sprockets and steering brake-drums supported in said housings independently of the driving means and each geared to the associated differential shaft independently of the differential gearing.

8. In a tractor, a power plant, track frames and endless tracks on opposite sides of the power plant, rear driving sprockets for the tracks, driving units including housings on opposite sides of the rear portion of the power plant and driving means including differential shafts connected to said sprockets, steering brake-drums supported in said housings independently of the driving means and each driven by the associated differential shaft independently of the differential gearing, and brake-bands surrounding the drums, said housings having openings by which access may be had to said bands for adjusting purposes.

9. In a tractor, a main frame including a power plant, track frames pivotally connected on opposite sides of the frame, and means for resiliently supporting the forward part of the main frame comprising arms projecting laterally outward therefrom, studs rigidly secured to the track frames and passing through the outer ends of the arms so as to serve as guides therefor, and cushioning means between the arms and track frames.

10. The combination with the power plant including the engine, transmission and differential of a wheel tractor, of a converting attachment for facilitating the change from a wheel tractor into a tractor of the crawler type, comprising a housed unitary driving assembly having a differential shaft for connection with the differential gear of the power plant, a shaft for receiving a driving sprocket for an endless track and stepdown gearing interposed between said shafts, said housed assembly additionally having means by which a weight-supporting connection may be made independently of said shafts.

11. The combination with the power plant of a wheel tractor, said power plant including an engine, transmission and differential, of a converting attachment for facilitating the change from a wheel tractor into one of the crawler type comprising a unitary driving assembly including a closed housing, a differential shaft supported thereby and adapted to be connected with the differential gear of the power plant, a shaft for receiving a sprocket for driving an endless track, a third shaft having a steering brake-drum, step-down gearing between the differential shaft and second mentioned shaft and step-up gearing between the differential shaft and the brake-drum.

12. The combination with the power plant of a wheel tractor, said power plant including an engine, transmission and differential, of a converting attachment for facilitating the change from a wheel tractor into one of the crawler type comprising a driving unit adapted to be secured to the power plant frame and including a closed housing having a plurality of shafts supported in the housing and including a differential shaft extending through the inner wall thereof, a driving shaft adapted to be provided with a sprocket for driving an endless track and extending through the outer wall, and power transmitting means between said two shafts and enclosed in the housing, said housing forming a lubrication receiving chamber separate from the lubricating chamber for the transmission and differential of the power plant, and said attachment comprising also a track frame carrying an endless track, the housing having means for forming a weight-supporting connection with the track frame independent of said shafts.

13. In a tractor, a power plant of the type having an engine, a transmission housing and a differential, driving units attached to opposite sides of the transmission housing, track frames and endless tracks on opposite sides of the power plant, rear driving sprockets for the tracks, each driving unit including a housing and driving means in said housing connected to the associated driving sprocket and to the differential, and a steering brake-drum also enclosed in each driving unit housing and connected to the driving means therein but supported independently thereof.

14. In a crawler type tractor a power plant including an engine and a differential, track frames and endless tracks on opposite sides of the power plant, rear driving sprockets for the tracks, driving units on opposite sides of the rear portion of the power plant including closed housings secured to opposite sides of the power plant, driving means in said housings including shafts adapted to engage the differential and connected to said sprockets, said shafts projecting through the inner walls of the housings, steering brake-drums enclosed in said housings and step-up gearing interposed between the brake-drums and the differential shafts.

15. In a tractor of the crawler type, a power plant including an engine, transmission housing and differential, driving units comprising housings secured to opposite sides of the rear portion of the power plant, each driving unit including a differential shaft projecting through the inner wall of the housing and adapted to be connected to a gear of the differential, a driving shaft projecting through the outer wall of the housing and adapted to be provided with a sprocket for driving an endless track, a shaft separate from the first mentioned shafts and provided with a steering brake-drum enclosed within the housing, driving means between the differential shaft and said driving shaft and also between the differential shaft and the drum, said driving means being also enclosed in the housing and the drum being driven at a higher speed than the differential shaft.

16. An attachment for converting into a tractor of the crawler type a wheel tractor having an engine, transmission and differential, said attachment including a pair of driving units adapted to be secured to opposite sides of the power plant of the wheel tractor, each unit comprising a housing with inner and outer walls, a differential shaft projecting therefrom through the inner wall, a second shaft projecting from the housing through the outer wall and adapted to be provided with a track driving sprocket, and means in said housing for transmitting motion from the differential shaft to the second shaft, the housings having means by which weight-supporting connections may be made independently of said shafts.

17. A converting attachment for use in the substitution of endless tracks for the ground wheels of a wheel tractor, said attachment including a pair of driving units adapted to be secured to opposite sides of the power plant of the tractor, each unit comprising a housing having inner and outer walls, two shafts projecting from opposite sides of the housing, one shaft which projects through the inner wall being a differential shaft and the other which projects through the outer walls being adapted to receive a track driving sprocket, gearing located in the housing and connecting said shafts, and a steering brake drum in the housing and geared to said differential shaft.

18. The combination with a power plant including the engine, transmission and transmission housing of a wheel tractor, of a converting means for changing the wheel tractor into a crawler tractor, said means including substitute units for the rear axle and its housings and comprising two unitary driving assemblies adapted for attachment to opposite sides of the transmission housing and having lower portions shaped to accommodate a weight transmitting member, and a third unit constituting the weight transmitting member for engagement with said lower portions of the said driving assemblies.

19. The combination with a power plant including the engine, transmission and transmission housing of a wheel tractor, of a converting means for changing the wheel tractor into a tractor of the crawler type, said means including substitute units for the rear axle and its housings and comprising housed unitary driving assemblies attached to opposite sides of the transmission housing and including shafts for connecting with the driving means of the power plant, a rigid member extending beneath the power plant and securely joining the lower portions of said assemblies, and track frames carrying endless tracks and having pivotal connection with said rigid member.

20. The combination with a power plant including the engine, transmission and transmission housing of a wheel tractor, of converting means for changing the wheel tractor to a tractor of the crawler type, said means including substitute units for the rear axle and its housings and comprising housed unitary driving assemblies adapted for attachment to opposite sides of the transmission housing and including shafts for connection with the driving means of the power plant, track frames having endless tracks constituting the substitute means for the wheels, a rigid member extending beneath the power plant and fixedly securing together the lower portions of the two housed driving assemblies, said rigid member having draw bar attaching means, and at its outer ends having pivotal connection with the track frames.

21. The combination with a power plant including the engine, transmission and transmission housing of a wheel tractor, the engine and transmission housing having adjacent flanges bolted together, of an attachment for converting the tractor into a crawler tractor, said attachment comprising track frames and endless tracks with driving sprockets and front idlers, and a yoke secured to said flanges for supporting the front part of the power plant upon the track frames and connected with the track frames rearwardly of the front idlers.

22. The combination with a power plant including the engine, transmission and transmission housing of a wheel tractor, the engine and transmission housing having adjacent flanges bolted together, of an attachment for converting the tractor into a crawler tractor, said attachment comprising track frames and endless tracks with driving sprockets and front idlers, the track frames and power plant having a pivotal connection by which the weight of the rear part of the power plant is transmitted to the frames, and a yoke supporting the front part of the power plant, said yoke having at its ends resilient connections with the track frames rearwardly of the front idlers and having a portion extending beneath the power plant and bolted to said flanges.

23. An attachment for the power plant of a wheel tractor for converting the same to a tractor of the endless track type, said attachment comprising endless tracks, track frames and sprockets, a cross member for yieldingly supporting the forward part of the power plant upon the track frames, two driving assembles for connecting the driving means of the power plant with the tracks and including housings adapted to be secured to opposite sides of the power plant, and a second cross member for transmitting the weight of the rear part of the power plant to the track frames, said last mentioned cross member adapted to be attached to the housings of the driving assemblies and to have pivotal connection with the track frames.

24. An attachment for the power plant of a wheel tractor for converting the same to a tractor of the endless track type, said attachment comprising endless tracks, track frames and sprockets, a cross member for yieldingly supporting the forward part of the power plant upon the track frames, two driving assemblies for connecting the driving means of the power plant with the tracks and including housings adapted to be secured to opposite sides of the power plant, and a second cross member for transmitting the weight of the rear part of the power plant to the track frames, said last mentioned cross member adapted to be attached to the housings of the driving assemblies and to have pivotal connection with the track frames, said second mentioned cross member having means for attaching a draw bar thereto.

25. In a tractor, a power plant including an engine, transmission and differential, track frames and endless tracks on opposite sides thereof, rear driving sprockets for the tracks, driving assemblies including housings secured to opposite sides of the rear portion of the power plant and each including also two shafts, one being a differential shaft extending through the inner wall of the housing and connected with the differential of the power plant and the other extending through the outer wall of the housing and carrying one of the driving sprockets for the tracks, and step-down power transmitting means connecting said two shafts, the housings having weight-supporting connections with the track frames independent of said shafts.

26. In a tractor, a power plant, track frames and endless tracks on opposite sides of the power plant, housings secured to opposite sides of the power plant, shafts extending inwardly from the housings to the power plant, shafts extending outwardly from the housings for driving the endless tracks, and power transmitting means between said shafts, the housings having weight-supporting connections with the track frames independent of said shafts.

27. In a tractor, a power plant, track frames and endless tracks on opposite sides of the power plant, housings secured to opposite sides of the power plant, shafts extending inwardly from the housings to the power plant, shafts extending outwardly from the housings for driving the endless tracks, and power transmitting means between said shafts, the housings having weight-supporting connections with the track frames independent of said shafts and the lower portions of the housings being rigidly connected together.

28. In a tractor, a power plant, track frames and endless tracks on opposite sides of the power plant, housings having their upper portions secured to opposite sides of the power plant and extending downwardly therefrom, shafts extending inwardly from the upper portions of the housings to the power plant, shafts extending outwardly from the lower portions of the housings and having means for driving the endless tracks, power transmitting means between said shafts and located in the housings, the lower portions of the housings having weight-supporting connections with the track frames independent of said shafts and being braced against relative lateral movement.

29. In a tractor, a power plant constituting the main frame of the tractor, track frames and endless tracks with driving sprockets on opposite sides of the power plant, driving units including housings secured to opposite sides of the power plant and sprocket driving means in the housings including driving shafts projecting outwardly from the housings and carrying the driving sprockets, the track frames being pivoted to the housings forwardly of said driving shafts and the pivots forming weight supporting connections between the power plant and track frames.

30. In a tractor, a power plant constituting the main frame of the tractor, track frames and endless tracks with driving sprockets on opposite sides of the power plant, driving units including housings secured to opposite sides of the power plant and sprocket driving means in the housings including driving shafts projecting outwardly from the housings and carrying the driving sprockets, and means forming pivots for the track frames and serving to transmit the weight of the rear part of the power plant to the track frames, said means being supported by and projecting laterally from said housings forwardly of said driving shafts.

31. In a tractor, a power plant constituting the main frame of the tractor, track frames and endless tracks with driving sprockets on opposite sides of the power plant, driving units including housings secured to opposite sides of the power plant and driving means in the housings including driving shafts projecting outwardly from the housings for driving said sprockets, the forward portions of the housings being braced against relative lateral motion and having weight transmitting connections with the track frames forwardly of said driving shafts.

32. In a tractor, a power plant constituting the main frame of the tractor, track frames and endless tracks with driving sprockets on opposite sides of the power plant, driving units including housings secured to opposite sides of the power plant, driving means in the housings including shafts projecting outwardly from the housings for driving said sprockets, means rigidly connecting the housings together and projecting laterally beyond the same and constituting pivots for the track frames as well as means for transmitting to the latter the weight of the rear part of the power plant.

33. In a tractor, a power plant constituting the main frame of the tractor, track frames and endless tracks with driving sprockets on opposite sides of the power plant, driving units including housings secured to opposite sides of the power plant and sprocket driving means in the housings including driving shafts projecting outwardly from the housings and carrying said sprockets, and means rigidly connecting the housings together and extending beneath the power plant and laterally beyond said housings, the laterally projecting portions constituting pivots for the track frames and serving to transmit the weight of the rear part of the power plant to the track frames.

34. In a tractor, a power plant constituting the main frame of the tractor, track frames and endless tracks with driving sprockets on opposite sides of the power plant, driving units on opposite sides of the power plant including housings and sprocket driving means therein including driving shafts projecting outwardly from the housings for driving said sprockets, the housings being divided into inner portions which are secured to opposite sides of the power plant and outer portions which are secured to the inner portions, and the inner portions carrying means by which the weight of the rear part of the power plant is transmitted to the track frames.

35. In a tractor, a power plant, track frames and endless tracks with driving sprockets on opposite sides of the power plant, driving units on opposite sides of the power plant including housings and sprocket driving means therein including sprocket driving shafts projecting outwardly from the housings, the housings being divided into inner portions which are secured to opposite sides of the power plant and outer portions which are secured to the inner portions, the inner portions carrying means by which the weight of the rear part of the power plant is transmitted to the track frames forwardly of the driving shafts, said means serving to brace and rigidly connect the housings together.

36. In a tractor, a power plant, track frames and endless tracks with driving sprockets on opposite sides of the power plant, driving units including housings secured to opposite sides of the power plant and sprocket driving means in the housings including driving shafts projecting outwardly from the housings for driving said sprockets, the forward portions of the housings being rigidly connected together independently of the power plant and having connections with the track frames by which the weight of the rear part of the power plant is transmitted to the track frames.

37. In a tractor, a power plant, track frames and endless tracks with driving sprockets on opposite sides of the power plant, driving units including housings secured to opposite sides of the power plant and sprocket driving means in the housings including driving shafts projecting outwardly from the housings for driving said sprockets, said housings having means for transmitting the weight of the rear portion of the power plant to the track frames and to form pivots for the track frames, said means projecting outwardly from the forward portions of the housings and also projecting inwardly from the housings to hold them against relative lateral movement.

38. In a tractor, a power plant, track frames and endless tracks with driving sprockets on opposite sides of the power plant, driving units including housings secured to opposite sides of the power plant and sprocket driving means in the housings including sprocket driving shafts projecting outwardly from the housings for driving the said sprockets, and pivots for the track frames clamped to the forward portions of the housings.

39. In a tractor, a power plant, track frames and endless tracks with driving sprockets on opposite sides of the power plant, driving units including housings and sprocket driving means therein including driving shafts projecting outwardly from the housings and carrying said sprockets, said housings having inner portions which are secured to opposite sides of the power plant and outer portions removable attached to the inner portions and through which said driving shafts extend, the inner portions having secured thereto forwardly of the said driving shafts pivots for the track frames, said pivots extending inwardly to secure the housings together.

40. In a tractor, a power plant, track frames and endless tracks with driving sprockets on opposite sides of the power plant, driving units including housings and sprocket driving means in the housings including driving shafts projecting outwardly from the housings and carrying the driving sprockets, said housings having inner portions which are secured to opposite sides of the power plant and outer portions removably attached to the inner portions and through which the said driving shafts extend, the inner portions having secured thereto forwardly of said driving shafts pivots for the track frames, said pivots being at the outer ends of a member extending beneath the power plant from one housing to the other.

In testimony whereof, I hereunto affix my signature.

WILLIAM H. WHITACRE.